(12) United States Patent
Cheng et al.

(10) Patent No.: US 8,346,863 B2
(45) Date of Patent: Jan. 1, 2013

(54) CONTACT INITIALIZATION BASED UPON AUTOMATIC PROFILE SHARING BETWEEN COMPUTING DEVICES

(75) Inventors: Tsz Simon Cheng, Grand Prairie, TX (US); Daniel Hassell, Flower Mound, TX (US); Mathews Thomas, Flower Mound, TX (US)

(73) Assignee: International Business Machines Corporation, Armonk, NY (US)

( * ) Notice: Subject to any disclaimer, the term of this patent is extended or adjusted under 35 U.S.C. 154(b) by 1606 days.

(21) Appl. No.: 11/464,728

(22) Filed: Aug. 15, 2006

(65) Prior Publication Data

US 2008/0123683 A1  May 29, 2008

(51) Int. Cl.
*G06F 15/16* (2006.01)
*G06F 3/00* (2006.01)
*G06F 9/00* (2006.01)
*G06Q 10/00* (2012.01)

(52) U.S. Cl. .......... 709/204; 709/229; 715/700; 726/11; 705/7.14

(58) Field of Classification Search .......... 709/217–219, 709/201–204
See application file for complete search history.

(56) References Cited

U.S. PATENT DOCUMENTS

| | | | | |
|---|---|---|---|---|
| 6,745,193 | B1 * | 6/2004 | Horvitz et al. | 707/101 |
| 7,139,841 | B1 * | 11/2006 | Somasundaram et al. | 709/245 |
| 2002/0010784 | A1 * | 1/2002 | Clayton et al. | 709/229 |
| 2002/0016727 | A1 * | 2/2002 | Harrell et al. | 705/7 |
| 2002/0055974 | A1 * | 5/2002 | Hawkes et al. | 709/204 |
| 2002/0070954 | A1 * | 6/2002 | Lang | 345/700 |
| 2002/0081972 | A1 | 6/2002 | Rankin | |
| 2002/0194350 | A1 * | 12/2002 | Lu et al. | 709/229 |
| 2003/0087652 | A1 * | 5/2003 | Simon et al. | 455/466 |
| 2004/0189476 | A1 * | 9/2004 | Borovoy et al. | 340/573.1 |
| 2004/0203363 | A1 * | 10/2004 | Carlton et al. | 455/41.2 |
| 2005/0038876 | A1 * | 2/2005 | Chaudhuri | 709/219 |
| 2005/0120119 | A1 * | 6/2005 | Bhanu et al. | 709/229 |
| 2005/0174975 | A1 * | 8/2005 | Mgrdechian et al. | 370/338 |
| 2005/0227676 | A1 | 10/2005 | De Vries | |
| 2005/0235062 | A1 | 10/2005 | Lunt et al. | |
| 2005/0250552 | A1 | 11/2005 | Eagle et al. | |
| 2005/0270170 | A1 | 12/2005 | Krumm et al. | |
| 2006/0023866 | A1 * | 2/2006 | Dezonno | 379/265.09 |
| 2006/0041615 | A1 | 2/2006 | Blank et al. | |
| 2006/0088038 | A1 | 4/2006 | Ravula et al. | |
| 2006/0246973 | A1 * | 11/2006 | Thomas et al. | 463/4 |
| 2007/0015463 | A1 * | 1/2007 | Abel et al. | 455/41.1 |
| 2007/0199060 | A1 * | 8/2007 | Touboul | 726/11 |

* cited by examiner

*Primary Examiner* — Ian N Moore
*Assistant Examiner* — Kiet Tang
(74) *Attorney, Agent, or Firm* — Patents on Demand P.A.; Brian K. Buchheit; Scott M. Garrett

(57) ABSTRACT

A method of initiating contact based upon automatically shared profile data can include a step of automatically and wirelessly exchanging profile information between at least two computing devices. A determination can be made as to whether a contact opportunity exists by comparing received profile information with a set of previously established contact rules. A notification of a contract opportunity can be automatically presented upon one of the computing devices, depending upon whether the profile information favorably compares with the contact rules.

19 Claims, 4 Drawing Sheets

CONTACT INITIALIZATION BASED UPON AUTOMATIC PROFILE SHARING BETWEEN COMPUTING DEVICES

BACKGROUND

1. Field of the Invention

The present invention relates to collaboration systems and, more particularly, to contact initialization based upon automatic profile sharing between computing devices.

2. Description of the Related Art

In any crowd or gathering of people commonalities exist. These commonalities can include shared hobbies, interest, business dealings, friends, relatives, and the like. These people are largely unaware of the commonalities, which results in many missed opportunities for business and interpersonal relationships. The problem is one of recognizing potential contact situations and interpersonal opportunities and initializing contact to explore these opportunities.

For example, a person can be waiting in an airport for a flight. A nearby person, who is also waiting for the flight, can be an existing customer of a company for which the first person works. The first and second person can also share an interest in a sports team, which is about to play a game, which is televised at an airport café. If both people knew of their commonalities, both people may want to introduce each other and watch the game together at the café. Most likely, however, the opportunity to watch the game together and potentially establish groundwork for future business relations would be missed due to a lack of knowledge of the shared commonalities.

What is needed is a technology/methodology by which people can increase their environmental awareness so that they can be made aware of commonalities with nearby individuals. No known tool exists to automatically detect commonalities with nearby peoples, to alert people of these commonalities, and to facilitate contact based upon these commonalities.

SUMMARY OF THE INVENTION

A solution for automatically sharing profile information between computing devices to alert device owners of commonalities with nearby people. The sharing can be restricted to a configurable range, which can be defined by hardware and/or software limits. The range limits can, for example, be based upon a communication range for device-to-device BLUETOOTH-based communications. Devices can broadcast profile information to other device within this range. Device owners can configure different contact rules, which are used to automatically process received profile information. Contact rules can be associated with contact actions that can be automatically taken when received profile data satisfies an associated rule. For example, a contact action can send a message to a device owner and/or an owner of the profile information. The message can detail the commonality, can provide contact information, and can request an interpersonal contact be established.

The present invention can be implemented in accordance with numerous aspects consistent with material presented herein. For example, one aspect of the present invention can include a method of initiating contact based upon automatically shared profile data. The method can include a step of automatically and wirelessly exchanging profile information between at least two computing devices. A determination can be made as to whether a contact opportunity exists by comparing received profile information with a set of previously established contact rules. A notification of a contact opportunity can be automatically presented upon one of the computing devices, depending upon whether the profile information favorably compares with the contact rules.

Another aspect of the present invention can include a machine-readable storage having stored thereon, a profile handing software agent. The profile handling agent can include a broadcasting module and a receiver module. The broadcasting module can broadcast profile information over an automatically established wireless personal area network (PAN). The profile information can include a set of user information, which is stored locally upon a mobile computing device within which the profiling handling agent executes. The receiver module can receive responses to the broadcasted profile information over the PAN. The mobile computing device can automatically present a notification whenever a received response indicates that a contact opportunity exists. The contact opportunity can be based at least in part upon the conveyed profile information and a response received from a different computing device.

It should be noted that various aspects of the invention can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, or any other recording medium. The program can also be provided as a digitally encoded signal conveyed via a carrier wave. The described program can be a single program or can be implemented as multiple subprograms, each of which interact within a single computing device or interact in a distributed fashion across a network space.

It should also be noted that the methods detailed herein can also be methods performed at least in part by a service agent and/or a machine manipulated by a service agent in-response to a service request.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
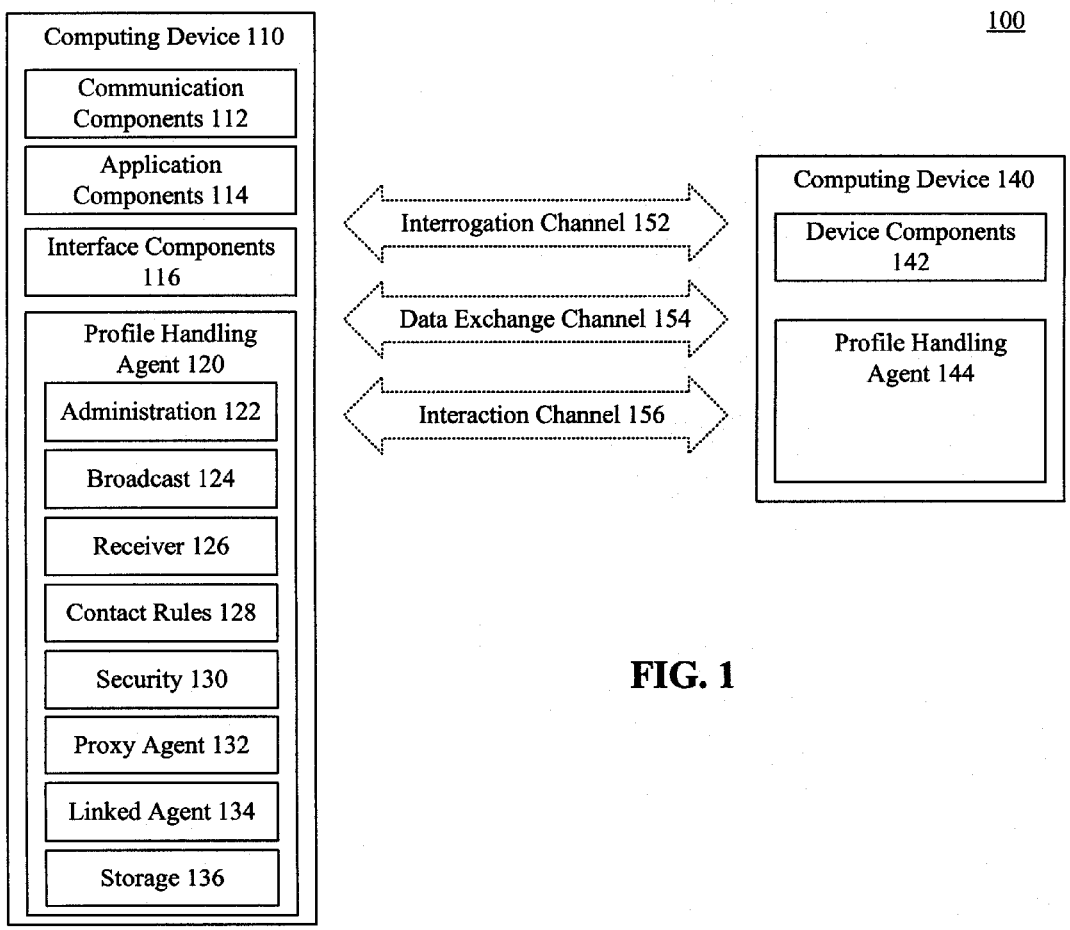
FIG. 1 is a schematic diagram of a system for automatically sharing profile information between devices in accordance with an embodiment of the inventive arrangements disclosed herein.

FIG. 1 is a schematic diagram of a system 100 for automatically sharing profile information between devices in accordance with an embodiment of the inventive arrangements disclosed herein. More specifically, system 100 can include two computing devices 110 and 140, each of which includes a profile handling agent 120 and 144, respectively. Each profile handling agent 120 and 144 can include a profile for a device user, which provides some identifying information concerning that person, which can be configured by that person in any manner he or she desires. When devices 120 and 140 are within a communication range of each other, such as within a BLUETOOTH range, profiling information can be automatically shared. The receiving device 110 and/or 140 can compare the received information against a set of contact rules 128 and can selectively execute a communication based upon this comparison. A contact action can be an action designed to facilitate an interpersonal collaboration between device owners, who may not have previously met.

As shown in system 100, computing device 110 an computing device 140 can each be a consumer electronic device, such as a mobile telephone or personal data assistant (PDA), upon which a profile handling agent 120 and 144 is loaded. Each communication device 110 and 140 can also include a number of components, such as components 112-116 and 142. The components for each device 110 and 140 can differ from each other. For example, device 110 can be a mobile telephone and device 140 can be a handheld entertainment system. Both devices 110 and 140 can share an ability to communicate over one or more communication channels 152-156, including an interrogation channel 152, a data exchange channel 154, and an interaction channel 156.

Depending on implementation specifies used in system 100, the different channels 152-156 can use the same communication protocols as other channels 152-156 or can use different, channel specific communication protocols.

The interrogation channel 152 can be used to send availability, acknowledgement, and authorization data between profile-sharing devices. For example, interrogation channel 152 can be used by computing devices 110 and/or 140 to announce a profile sharing capability to each other. Unlike other communication channels, such as channels 154 and/or 156, which can permit encrypted or secure communications, the interrogation channel 152 will generally be an open or unencrypted channel. Additionally, the interrogation channel 152 can have a more restricted range than other channels 154 and/or 156. This restricted range can ensure that profile sharing only occurs between people located near each other. The restricted range can be a user configurable software-based limitation and/or a hardware limitation, such as a range of BLUETOOTH based communication. In situations where profile sharing between devices 110 and/or 140 is restricted, identification information, certification information, and/or authorization information can be conveyed over the interrogation channel 152 before profile sharing occurs.

The data exchange channel 154 can be an infuriation sharing channel used to convey profiling and other information between devices 110 and/or 140. In one embodiment, profile information exchanged between devices 110 and 140 over channel 154 can be protected to prevent potential information abuses. For example, conveyed profile information can be configured to automatically expire after an owner-established duration. In another example, access rights for content within a conveyed profile can be restricted for use by profile handling agents only. Other applications can be prevented from viewing this information, unless explicit permission is granted by an information conveyer. This protection can be implemented using encryption technologies, proprietary data formatting, secure data conveyance standards, and the like.

In one arrangement, the profiling data exchanged over channel 154 can be segmented into different granularity levels, such as an overview level, a detailed level, and a secure level. Access to different levels can require authorization. When a commonality exists between device users, as determined by agents 120 and/or 144, additional information, such as information contained in a lower granularity level of a profile, concerning that interest can be requested and conveyed over channel 154.

For example, a profile overview conveyed from device 110 to 140 can indicate that a user of device 110 plays chess as a hobby. Rules in device 140 can cause the device to determine more information, such as an ELO rating to determine if the users of devices 110-140 have compatible skills. Further queries to determine resident applications on the devices 110 and 140 can be conducted to determine if it would be possible for users of the devices 110 and 140 to interactively, engage in a chess game using software loaded on devices 110 and 140. If so, a notification can be generated to inform users of devices 110 and/or 140 of the common interest in chess. The notification can specify the respective ELO rank of each player, can propose a time for playing a game, and/or can indicate that a game can be played using a pre-existing chess application already loaded on the devices 110 and 140. The additional information exchanged between devices 110 and 140 can be conducted via a user-device communication mode and/or an automated communication mode. The user-device communication mode and the automated communication mode can each result in an exchange of information over channels 152 and/or 154. The automated communication mode can be a device-to-device information exchange mode with little to no user interaction between users and devices where queries are automatically constructed and information provided based upon the previously configured rules 128.

The user-device communication mode can be a mode where one of the users interacts with a device 110 or 140 via a user-device interface, where the interactions can result in user-directed information exchanges between devices 110 and 140. The user-device communication mode permits device-to-device information exchanges and device-to-user interactions. In one example, a user utilizing device 110 in the user-device communication mode can direct device 110 to provide a top five potential contact opportunities with nearby users. Further interactive inquiries can be used to aid the user to determine, which, if any, of these opportunities should be pursued.

For instance, the top five potential contact opportunities can be presented with a brief description of opportunity specifics. One of the opportunities can specify a shared hobby of chess exists with a nearby person. In the user-device communication mode, the user can further query for an age, gender, name, and ELO ranking of this nearby chess player. The user for whom queries are directed is not directly contacted until an explicit decision to do so is made. This user may not be aware of the data exchanges resulting from another user interacting in the user-device communication mode. Therefore, if the first user only prefers to play chess with adults and discovers that the nearby chess player is a child, the first user can choose to ignore the potential contact opportunity without ever having explicitly initiated contact with the nearby chess-playing youngster.

The interaction channel 156 can be used to permit users to interact or communicate with each other via their devices 110 and 140. Interaction channel 156 can permit telephone interactions, text-messaging, chatting, instant messaging, email, electronic-document sharing, co-browsing, interactive gaming, and any other form of interactive communication, which can depend upon capabilities of the respective devices 110 and 140.

Turning to specifics of device 110, communication components 112 can exist which enable communications with other devices, such as device 140. The communication components 112 can be capable of different communication modes, such as telephone mode, an instant messaging mode, a direct data exchange mode, and the like. One of the communication modes can enable direct peer-to-peer communications (e.g. BLUETOOTH communications). Another of the communication modes can enable server-assisted communications (e.g. mobile telephony communications).

The application components 114 on a computing device 110 can be used to facilitate interactions and/or to store profile data in an organized fashion. For example, the application components 114 can include an email program or text messaging program, both of which can be used to communicate over channel 156. Application components 114 can also include a contact management application, and scheduling application, and the like. The contact management application can, in one illustrative instance, directly upload profile information from device 140. The scheduling application can be integrated with the contact rules 128 so that contact actions can depend upon a schedule of a device 110 owner.

Interface components 116 of devices 110 can permit a user to interface with the device 110. Common interfaces include voice interfaces, text interfaces, graphical user interfaces, and the like. Interfaces components 116 can utilize peripherals attached to or integrated with the computing device 110.

The profile handling agent 120 can include machine readable instructions encoded in software/hardware/firmware capable of being understood by computing device 110. These instructions can allow profile sharing to occur, as described herein. The agent 120 can include an administration module 122, a broadcast module 124, a receiver module 126, a contact rules module 128, a security module 130, a proxy agent module 132, a link agent module 134, a storage module 136, and the like.

The administration module 122 can permit a user to configure the profile handling agent 120 and to selectively enable profiles. Multiple profiles can exist, such as a business profile, a family and a friend's profile, and a dating profile, which can be activated under different conditions that can be specified using administration module 122. For example, a business profile can be activated Monday through Friday from nine am to six pm, a family profile can be activated Monday through Friday after six pm and a dating profile can be activated Saturdays between six pm and midnight. Activation conditions are not restricted to time windows and other conditions can be specified.

The broadcast module 124 can handle details for broadcasting profile data to other computing devices, such as device 140. For example, the broadcast module 124 can establish different granularity levels for profiles, broadcast conditions, security rights for broadcasting profiles, profile expiration times, broadcast protocols, broadcast range, and the like. Similar functions and features for receiving profile data from other devices can be handled by the receiver module 126.

The contact rules module 128 can dictate when contact based upon shared profile data should be initiated and/or when notifications concerning potential contacts are to be provided. Contact rules module 128 can also state what contact actions, if any, are to be taken. The contact rules module 128 can establish various thresholds, factors, and values, which are used to determine desired responses for different contact opportunities.

For example, contact rules module 128 can classify different contact opportunities as critical, important, moderate, unimportant, and disfavored. A user's current status can be classified as frantic, busy, average, and slow. A rules can state that when an opportunity is important and when a user's status is average or less, that the user is to be notified immediately of the contact opportunity. A different rule can establish that when an opportunity is of moderate importance and when the user is busy or greater, then contact information for a potential contact is to be stored and that a message is to be automatically conveyed indicating to the profile conveying party that contact is desired, but that the current individual is presently occupied.

Security module 130 can handle security functions and features for agent 120. Communication channel encryption techniques, file encryption techniques, authorization codes usage, exchanged certificates, and the like can all be used by the security module 130. The security module 130 can establish access rights and/or expiration conditions on transmitted profile data.

Security can exist for conveyed profile data and for received profile data. For example, received profile information can be scanned for malicious content, such as viruses or spyware. Any suspicious content can be discarded and/or quarantined. Firewall procedures can also be instituted to prevent unauthorized automated data exchanges. For example, a user can be a member of a profile sharing network or service and profile sharing can be restricted to other members of the same network or service. In another example, a conference can permit profile sharing among paying participants, where guests are denied this ability. Sharing restrictions and permissions can be enabled by requiring devices 110 and 140 to possess a private/public key in order to participate in a particular profile sharing service or group.

The proxy agent module 132 can act as a proxy for another device, when permitted by the device 110 owner. For example, device 140 can request that device 110 be a proxy for device 140. If the proxy request is accepted, all profile-based communications of device 140 can pass through device 110, until the proxy feature is disabled. Profile-based communications associated with device 140 and/or a user of device 140 will be based upon specifies of profile handling agent 144 and not profile handling agent 120. The use of the proxy agent module 132 can be particularly useful in situations where a user does not want to disclose his or her identity.

The linked agent 134 can be used to create virtual cooperative networks or ad hoc networks between multiple computing devices, thereby extending an effecting communication range of the devices. For example, devices 110 and 140 can be outside of a wireless broadcasting range of each other, but can both be within a communication range of a third device (not shown). A virtual cooperative network can be established between the three devices, permitting the third device to route information between devices 110 and 140.

The storage module 136 can manage specifies related to storage. The storage module 136 can determine a time period for which messages can be stored when communications are intermittent or fail for a period of time. For example, a user communicating with device 110 who is near the outer communication range of device 110 can intermittently exchange information. The storage module 136 can establish criteria for which information is stored in case the recipient comes back within range, at which point, stored messages can be conveyed. The storage module 136 can also determine criteria for deleting and/or saving external profile information sent to device 110. The criteria can be established by a user receiving the profile information and/or by the user sending the information. For example, a time based criteria can be established to delete all profile information after thirty minutes of receiving the information unless a communication was explicity established with a user for whom the profile information relates.

It should be appreciated that the device components 142 of device 140 can be similar to components 112-116 of device 110. The components 142 can also vary significantly from components 112-116, so long as at both devices 110 and 140 include compatible profile handling agents 120 and 144 and are both capable of sharing profiles over channels 152-156.

Figure 2:
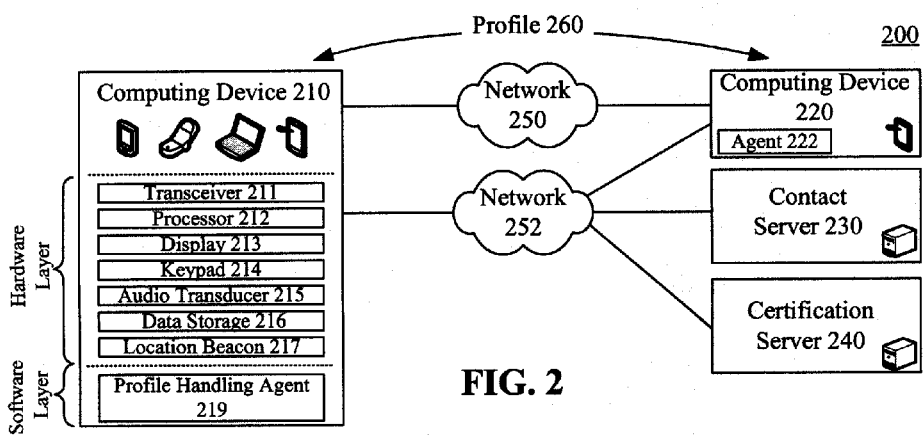
FIG. 2 is a schematic diagram showing a profile sharing computing system in accordance with an embodiment of the inventive arrangements disclosed herein.

FIG. 2 is a schematic diagram showing a profile sharing computing system 200 in accordance with an embodiment of the inventive arrangements disclosed herein. System 200 can include a computing device 210 and a computing device 220, which share profile 260 data directly via network 250. Profile sharing functions can be handled by profile handling agents 219 and/or 222. The profile handling agents 219 and 222 can be implemented as a software/firmware module, as a local stand-alone application, as a remotely called application, as a Web service, as a plug-in, as an applet, and the like.

Network 250 can include wireless and/or line-based communication pathways, which permit data to be exchanged directly between devices 210 and/or 220. Network 250 can utilize any of a variety of protocols and/or standards to exchange information. For example network 250 can use BLUETOOTH, Universal Plug and Play (UPnP), an infrared Data Association (IrDA) protocol, and IEEE 802.11 protocol, and other wireless protocols to share profile 260 data. Network 250 can also use line-based connections and protocols including, but not limited to, Universal Serial Buss (USB), FIREWIRE, a Laplink connection, an Ethernet crossover connection, and the like.

Computing devices 210 and 220 can be any device, mobile or otherwise, capable sharing profile information. Computing devices 210 and 220 can, for example, include a mobile phone, a personal data assistant (PDA), a media player, an entertainment system, a tablet computer, a wearable computer, notebook, an embedded computing system, a desktop computer, a handheld navigation device, and the like. Each computing device 210 and/or 220 can include a variety of hardware components, such as transceiver 211, processor 212, display 213, keypad 214, audio transducer 215, data storage 216, and/or location beacon 217.

Transceiver 211 can be any communications device capable of both transmitting and receiving data. Multiple different transceivers 211 can be included in each computing device 210 and 220. For example, transceivers 211 for BLUETOOTH, USB, and 802.11 protocol, ETHERNET, FIREWIRE, mobile telephony communications, two way radio communications, and the like can be included in device 210.

The processor 212 can be an electronic computer central processing unit (CPU) that performs processing operations for device 210. The processor 212 can be connected to a circuit board (not shown), power supply (not shown), and other electronic components. The display 213 can include a screen upon which text and/or graphics can be presented. The keypad 214 can include a number pad, a keyboard, and the like. Audio transducer 211 can be a device that converts one form of energy into another form of energy, such as converting sound to electrical impluses (acting as a microphone) and/or converting electrical impulses to sound (acting as a speaker). Voice and/or audio interfaces can require audio transducer 215 as well as speech processing components (not shown). Other peripherals (not shown), such as a mouse, pointer, touchpad, biometric sensor, camera, and the like, can be included in computer device 210.

Data storage 216 can be used to store profile handling agent 219, profile information, contact rules, contact actions, and the like. Data storage 216 can include any type of information store including, but not limited to, a magnetic disk, an optical disk, a semiconductor memory, a digitally encoded plastic memory, a holographic memory, or any other recording medium. The data storage 216 can be a local store or a networked storage space. Information contained in storage 216 can be stored within a database structure or can be stored within one or more files of a file storage system, where each file may or may not be indexed for information searching purposes. Data storage 216 can utilize one or more encryption mechanisms to protect stored information from unauthorized access.

The location beacon 217 can be include a device tracking component such as a radio frequency identification (RFID) tag and/or a global positioning system (GPS) component. The location beacon 217 can be used to determine absolute or relative coordinates of device 210. In one embodiment a location from beacon 217 can be combined with mapping data to guide a user of device 210 to a location of profile sharing device 220 (assuming that an interpersonal contact is desired).

In system 200, computing devices 210 and 220 can also be communicatively, linked to network 252 to which contact server 230 and certification server 240 can be connected. Computing devices 210 and 220 call convey information between each other including profile 260 data, using network 252. Communications over network 252 will normally be based upon Internet Protocol (IP) and/or telephony protocols.

Network 252 can include any hardware/software/and firmware necessary to convey data encoded within carrier waves. Data can be contained within analog or digital signals and conveyed though data or voice channels. Network 252 can include local components and data pathways necessary for communications to be exchanged among computing device components and between integrated device components and peripheral devices. Network 252 can also include network equipment such as routers, data lines, hubs, and intermediary servers which together form a data network, such as the Internet. Network 252 can also include circuit-based communication components and mobile communication components, such as telephony switches, modems, cellular communication towers, and the like. Network 252 can include line based and/or wireless communication pathways.

The contact server 230 can optionally provide supplemental information that facilitates interactions and/or profile sharing between computing device 210 and/or 220. It should be emphasized that the contact server 230 is not necessary for the operation of system 200 and that direct peer-to-peer communications between devices 210-220 can be performed without server 230. In one embodiment, the contact server 230 can include an email server, an instant messaging server, a chat server, a telephony server, and the like, which can be involved in establishing or maintaining interactive communications between devices 210 and 220. The contact server 230 can connect either device 210 and/or 220 to a networked resource, such as a Web site, which can host interactive games, co-browsing sessions, teleconferencing sessions, and the like for devices 210 and/or 220.

The contact server 230 can permit data exchanged between devices 210 and 220 to be remotely stored or accessed via remotely located resources which can be extremely, beneficial for when either device 210 and/or 220 is a mobile device with limited computing resources. For example, a profile-sharing occurrence can result in a business meetings being established between users of the devices 210 and 220, where an owner of device 220 is going to present material in a slide-show format. A slide-show file can be conveyed from device 220 to device 210 before the meeting. Device 210 can be unable to directly, access (or even store) the content of the slide-show file. Profile handling agent 219 can, recognizing the limitations of device 210, convey the slide-show file to contact server 230, which can be a desktop computer accessible by a user of device 210. A remote viewing client (e.g. CITRIX) can permit device 210 to view open and view the slide-show file, which uses an application residing on the desktop computer. Thus, contact server 230 can be used in conjunction with computing device 210 to overcome resource limitations of device 210.

In still another embodiment, contact server 230 can further include a range-extension server that increases a range over which computing devices 210 and/or 220 can share information. For example the devices can typically share profile information via BLUETOOTH transmissions, which limit transmission range to approximately thirty feet. A range-extension server can accept, repeat, and/or receive wireless network communications, such as 802.11 protocol communications, from devices 210 and/or 220, thereby permitting profile data to be shared up to a range of the wireless network.

Certification server 240 can be optionally used to establish certified, secure, verified and/or private networks for profile sharing. The certification server 240 can be one of many security components involved in system 200 to prevent abuses, such as identity theft, from occurring as a result of profile sharing. Additionally, certification server 240 can be used to verify that information contained in a profile is accurate. For example, the certification server 240 can check tax records, address records, business records, professional licenses, and the like to ensure that a name, address, occupation, salary, and other information in a profile is accurate and not fictitious. Use of this verification function of the server 240 can prevent users from masquerading as others. Special identifiers can be presented upon display 213 to indicate when server 240 has verified a user's profile information or when the profile information is not able to be verified.

Figure 3:
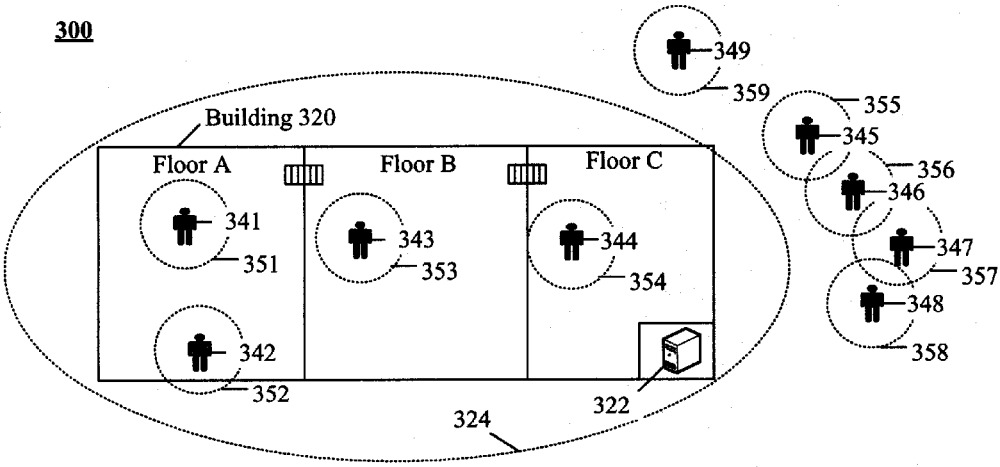
FIG. 3 is an illustration showing multiple people in a profile-sharing environment in accordance with an embodiment of the inventive arrangements disclosed herein.

FIG. 3 is an illustration showing a plurality of individuals in a profile-sharing environment 300 in accordance with an embodiment of the inventive arrangements disclosed herein. Each person 341-349 in environment 300 can carry a computing device with a profiling agent, as described in system 100 and/or 200. Each device can have a communication range 351-359 within which profile data can be wirelessly exchanged using peer-to-peer communications (e.g. by BLUETOOTH or other wireless communication means).

A contact server 322 can be an optional component of environment 300 that is able to establish a communication range 324 for all people 341-344 in building 320 (e.g. using 802.11 based wireless networking technologies). Peer-to-peer communications between devices are still available using appropriate transceivers (e.g., BLUETOOTH) without using capabilities of server 322, even when devices are within range 324. The range 324 is a hardware limited range, and shorter, software limited ranges can be established by contact server 322 and/or individual computing devices. For example, person 341 and person 342 can establish a software defined range of "one floor" for profile sharing purposes. Accordingly, person 341 and 342 can share profile information with each other (although both are outside peer-to-peer ranges 351 and 352) with the assistance of server 322. Neither person 341 and/or 342 can share profile information with people 343 and/or 344 on different floors due to the software established range limitation. If a software range limitation, were extended to include a current and an adjacent floor, person 343 could share profiling information with persons 341, 342, and 344, but person 344 would be unable to share profile information with person 341 or 342.

In one embodiment, a series of personal area networks can interact to form a virtual cooperative network, thereby extending a profile sharing range. For example, overlapping ranges 355-358 can form a virtual cooperative network having an area of the combined ranges, which allows person 345 to share profile information with person 348. Hence, profile sharing devices of person 346 and 347 can automatically relay information conveyed between person 345 and 348.

Further, a temporary profile cache can be maintained in computing devices for a short period, permitting dynamic profile sharing in a time delayed fashion. For example, person 349 can have recently left building 320 and can have a profile cache containing profile data for persons 341-344 which was conveyed to the device, when the device was within range 324. When person 349 is within range 359 of person 345, the temporary profile cache information can be conveyed to person 345, informing person 345 of potential contact opportunities with people 341-344 based upon cached content transferred from a device of person 349. Moreover, contact desires and profile information associated with person 345 can be conveyed to profile caches included in devices of people 346-348. When any of the people 346-348 enter range 324, this cached content from person 345 can be conveyed to people 341-344.

Figure 4:
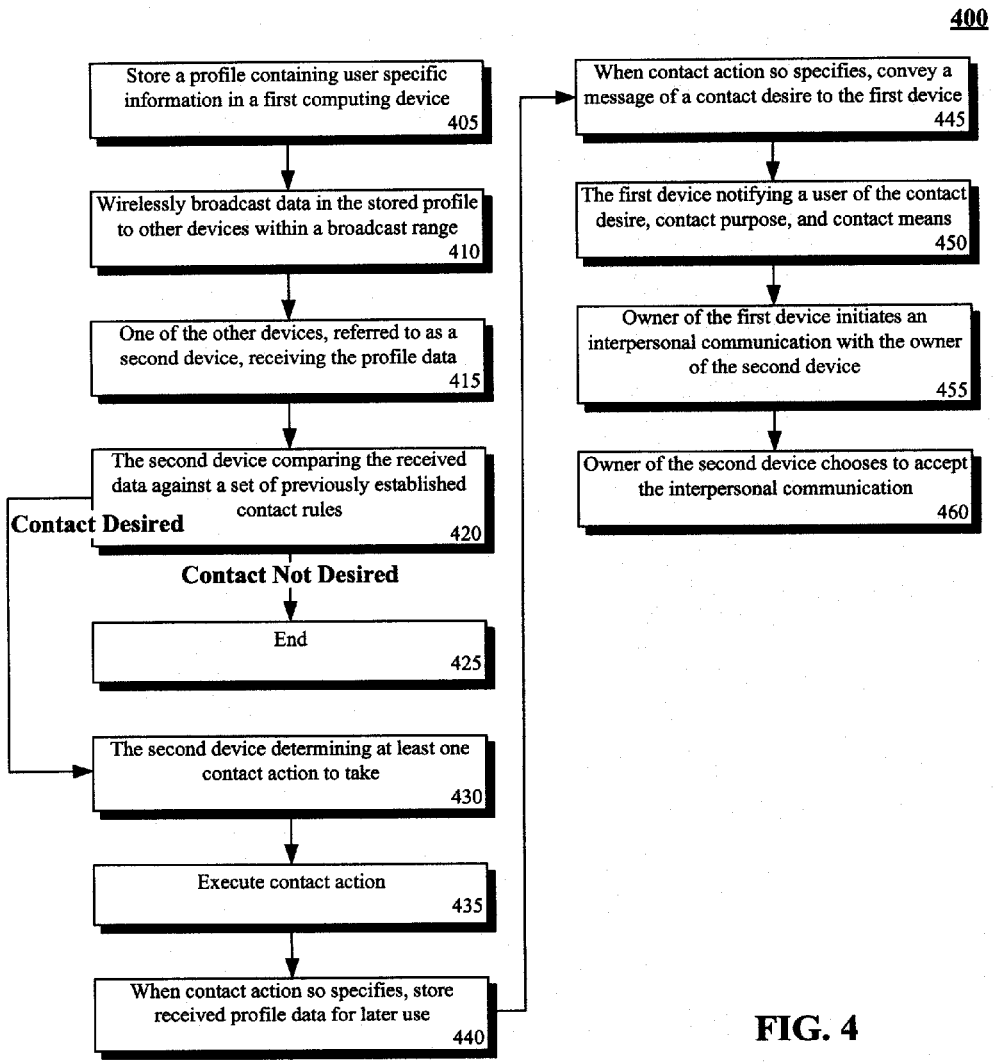
FIG. 4 is a flow chart of a method for sharing profile information between computing devices in accordance with an embodiment of the inventive arrangements disclosed herein.

FIG. 4 is a flow chart of a method 400 for sharing profile information between computing devices in accordance with an embodiment of the inventive arrangements disclosed herein. Method 400 can be performed in the context of a system 100, 200, or any system capable enabled to permit profile sharing.

Method 400 can begin in step 405, where a profile containing user specific information can be stored in a first computing device. The computing device can be a mobile device and the profile data can be user configurable. In step 410, data in the stored profile can be wirelessly broadcasted to other devices in a broadcast range. The broadcast range can be determined by hardware and/or software established limits. The broadcast can convey data directly using a peer-to-peer communication, such as a BLUETOOTH based communication.

In step 415, one of the devices can receive the profile data. This device can be referred to as a second computing device, which can also be mobile computing device. In step 420, the second device can compare the received data against a set of previously established contact rules, which can be user configured. If the rules determine that contact is not desired, then the second device can disregard the received profile data and the method can end in step 425.

If the rules indicate that contact is desire, then the method can progress from step 420 to step 430, where the second device can automatically determine at least one contact action to take. Contact actions can be user configurable actions established by the contact rules. In step 435, the determined contact action can automatically execute. In step 440, a contact action can indicate that contact information from the profile should be stored for later use and that an immediate contact is not appropriate at this time. In step 445, the contact action can indicate that an immediate interpersonal contact is desired. Towards this end, a message indicating a contact desire can be conveyed from the second device to the first device. All steps up to now (steps 405-445) can be automated steps not requiring user attention or interactions.

In step 450, the first device can notify a user of the desired contact. This notification can include a contact purpose and a contact means, which can be ascertained from information conveyed from the second device. The user of the first device can choose to ignore the notification or to act upon it. In step 455, the user can choose to initiate an interpersonal communication with the owner of the second device. For example, the first device can dial a telephone number of the second device or a text message can be conveyed from the first to the second device. In step 460, the user of the second device can be alerted to the interpersonal contact attempt (e.g. the second device can ring or a text message can be received). The user of the second device can then choose to accept the interpersonal communication. Before the interpersonal contact is established, both communicators can be aware of the shared common interest and of the purpose of the communication.

Figure 5:
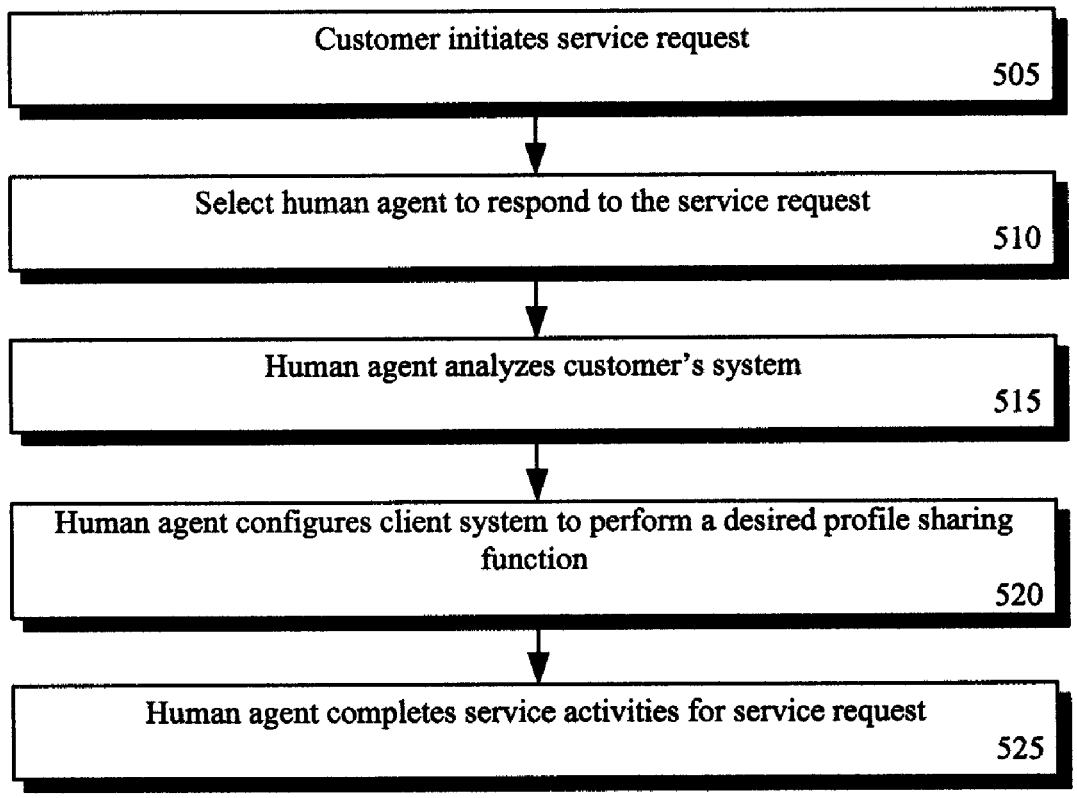
FIG. 5 is a flow chart of a method, where a service agent can configure a system or device that permits profile sharing in accordance with an embodiment of the inventive arrangements disclosed herein.

FIG. 5 is a flow chart of a method 500, where a service agent can configure a system or device that permits profile sharing in accordance with an embodiment of the inventive arrangements disclosed herein. Method 500 can be preformed in the context of system 100, 200, or method 400.

Method 500 can begin in step 505, when a customer initiates a service request. The service request can be a request for a service agent to add a profile handling agent upon one or more computing device for a customer. The request can also be a request to configure contact rules upon any of these devices. The request can also be to integrate profile sharing capabilities into one or more different applications, such as permitting calendaring application to provide availability information that is used by computing devices when sharing profile information. Requests can also be to add remote-server capabilities, such as profile certification or verification capabilities to an existing profile sharing system. In step 510, a human agent can be selected to respond to the service request. In step 515, the human agent can analyze a customer's current system or device and can develop a solution.

In step 520, the human agent can configure the client system or device so that the system is part of and/or communicatively linked to a profile sharing system. For example, the human agent can and business owned communication devices to a private profile sharing "network". In another example, the human agent can troubleshoot a problem with an existing profile sharing system and/or can add new customer desire features to an existing profile sharing system. In step 525, the human agent can complete the service activities.

It should be noted that while the human agent may physically travel to a location local to adjust the customer's computer or application server, physical travel may be unnecessary. For example the human agent can use a remote agent to remotely manipulate the customer's computer system.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A method of initiating contact based upon automatically shared profile data comprising:
   automatically wirelessly sending profile information from a sending computing device to a receiving computing device, wherein the sending device and the receiving device are collectively referred to as communication devices;
   automatically determining, at the receiving device, whether a contact action should be initiated by comparing received profile information with a set of previously established contact rules;
   upon a negative determination regarding initiating the at least one contact action, the receiving device taking no action, in which case the sending device receives no information from the receiving device responsive to the sending of the profile information, wherein when there is a negative determination regarding initiating the at least one content action, no profile information is ever sent from the receiving device to the sending computing device that is compared to information from the sending device; and
   upon a positive determination regarding initiating the at least one contact action, the receiving device initiating an interpersonal communication that permits users of the communication devices to communicate with each other, wherein the interpersonal communication is a device assisted communication in which each of the users provides content directed to the other as input to their one of the communication devices, and in which each of the users receives content provided by the other as output from their one of the communication devices.

2. The method of claim 1, wherein the interpersonal communication is a real-time communication between the users established via the communication devices.

3. The method of claim 1, wherein the interpersonal communication is an interactive gaming interaction, where each of the users participates in an electronic game in a session that includes the other user via their communication device.

4. The method of claim 1, further comprising:
   the receiving device contacting a remotely located certification server via a network to selectively verify whether the profile information conveyed from the sending device is accurate using information sources independent of the sending device.

5. The method of claim 1, wherein the interpersonal communication involves the sending device, the receiving device, and a remotely located contact server, which are connected to each other via a network, wherein the remotely located contact server facilitates the interpersonal communication, and wherein the remotely located contact server is one of an email server, an instant messaging server, a chat server, and a telephony server.

6. The method of claim 1, wherein data exchanges between the sending device and the receiving device selectively occur over a plurality of different channels, which include an interrogation channel, a data exchange channel, and an interaction channel.

7. The method of claim 6, wherein at least one of the plurality of different channels is an open, unencrypted channel, wherein at least one of the plurality of different channels is a secure communication channel that only communicates using encrypted data, wherein the profile information is conveyed only over the secure communication channel.

8. The method of claim 1, wherein the profile information is configured to automatically expire after a duration established by the sending device, wherein when the duration occurs, the profile information from the sending device is removed from the receiving device.

9. The method of claim 1, wherein access rights to the profile information are restricted so that the receiving device is able to compare the profile information with the previously established rules by executing a profile agent on the receiving device, but where the profile information is inaccessible from other applications executing on the receiving device.

10. The method of claim 1, wherein the receiving device comprises a scheduling application that is integrated with the previously established rules so that initiation of contact actions is dependent upon a schedule of a user of the receiving device, said schedule being established via the scheduling application.

11. The method of claim 1, wherein the determining of whether the at least one contact action should be initiated further comprises:
    classifying an importance level of a contact opportunity based on the profile information, wherein the previously established rule is more likely to result in a positive determination the higher the importance level of the contact opportunity.

12. A non-transitory machine-readable storage having stored thereon, a profile handling agent having a plurality of code sections, said profile handling agent comprising:
    a broadcasting module configured to broadcast profile information over an automatically established wireless personal area network, wherein the profile information includes a set of user configurable, user-specific information, which is stored locally upon a mobile computing device within which the profiling handling agent executes;
    a receiver module configured to receive responses to the broadcasted profile information over the personal area network, wherein the mobile computing device automatically presents a notification whenever a received response indicates that a contact opportunity exists, where the contact opportunity is based at least in part upon the profile information; and
    computer program product operable to:
        compare profile information received from a sending device via the receiver module against previously established rules;
        take no action, upon a negative determination regarding initiating the at least one contact action, in which case the broadcasting module transmits no responsive information to the sending device, wherein when there is a negative determination regarding initiating the at least one content action, no profile information is ever sent from the receiver module to the sending device that is compared to information from the sending device; and
        initiating, upon a positive determination regarding initiating the at least one contact action, an interpersonal communication between the device containing the profile agent and the sending device, where these two devices are collectively referred to as communication devices, wherein the interpersonal communication is a device assisted communication in which users of the communication devices provide content directed to the other as input to their one of the communication devices, and in which each of the users receives content provided by the other as output from their one of the communication devices.

13. The method of claim 1, wherein the determining of whether the at least one contact action should be initiated further comprises:
    determining a status of the user of the receiving device based on how busy the user of the receiving device is believed to be, wherein the previously established rule is more likely to result in a positive determination the less busy the user of the receiving device is believed to be by the determined status.

14. The non-transitory machine-readable storage of claim 12, wherein the receiver module is further configured to receive profile information sent from a different computing device over the personal area network, said profile handling agent further comprising:
    a contact rules module configured to compare received profile information against a set of previously established and user configurable contact rules, wherein when the contact rules indicate a favorable comparison, the mobile computing device sends an interpersonal contact request to a device that sent the received profile information, and wherein said profile handling agent further comprises:
    an administration module configured to manage a plurality of stored profiles for the mobile computing device and to selectively active different ones of the stored profiles depending on occurrences of a set of user configured conditions, wherein the broadcasted profile information is dependent upon which of the stored profiles are active.

15. The non-transitory machine-readable storage of claim 12, said profile handling agent further comprising:
    a security module configured to secure the profile agent against receiving malicious code and configured to prevent unauthorized individuals from accessing the broadcasted profile information.

16. A computing device comprising:
    a machine-readable storage having stored thereon, a profile handling agent, wherein said profiling agent causes the computing device to automatically receive profile information from a sending computing device to wherein the sending device and the computing device are collectively referred to as communication devices;
    automatically determine, whether at least one contact action should be initiated by comparing the profile information received by the receiving device with a set of previously established contact rules;
    upon a negative determination regarding initiating the at least one contact action, take no action, in which case the sending device receives no information from the receiving device responsive to the sending of the profile information wherein when there is a negative determination regarding initiating the at least one content action, no profile information is ever sent from the receiving device to the sending computing device that is compared to information from the sending device; and upon a positive determination regarding initiating the at least one contact action, initiate an interpersonal communication that permits users of the communication devices to communicate with each other, wherein the interpersonal communication is a device assisted communication in which each of the users provides content directed to the other as input to their one of the communication devices, and in which each of the users receives content provided by the other as output from their one of the communication devices.

17. The computing device of claim 16, wherein the computing device is a mobile computing device selected from a group of devices consisting of a mobile telephone, a personal data assistant, a wearable computer, a handheld media player, and a handheld entertainment device.

18. The computing device of claim 16, further comprising:
a transceiver configured to establish a wireless personal area network over which the profiling information is conveyed over a peer-to-peer communication channel.

19. The computing device of claim 18, further comprising:
a different transceiver configured to establish an interactive, bidirectional, real-time communication with other computing devices, wherein said computing device configured to automatically establish the real-time communication with the different device based upon a user selectable option, which has been selected responsive to the notification.

* * * * *